United States Patent [19]

Higashiyama

[11] 4,351,050

[45] Sep. 21, 1982

[54] FAIL-SAFE CONTROL COMPUTER

[75] Inventor: Kazuhiro Higashiyama, Atsugi, Japan

[73] Assignee: Nissan Motor Company, Limited, Kanagawa, Japan

[21] Appl. No.: 132,423

[22] Filed: Mar. 21, 1980

[30] Foreign Application Priority Data

Mar. 23, 1979 [JP] Japan ................................. 54-33884

[51] Int. Cl.³ ............................................ G06F 11/00
[52] U.S. Cl. ...................................... 371/12; 364/200
[58] Field of Search ............... 371/12, 13, 7; 364/200, 364/900

[56] References Cited

U.S. PATENT DOCUMENTS

| 3,576,982 | 5/1971 | Duke | 371/13 |
| 3,795,800 | 3/1974 | Nimmo et al. | 371/12 |
| 3,911,406 | 10/1975 | McLaughlin et al. | 364/200 |
| 3,988,603 | 10/1976 | Griffin | 371/12 |
| 4,072,852 | 2/1978 | Hogan et al. | 371/12 |

Primary Examiner—David H. Malzahn
Attorney, Agent, or Firm—Lowe, King, Price & Becker

[57] ABSTRACT

When control of a control program stored in a memory of a microcomputer runs wild and enters an otherwise unused memory location, an instruction written in the otherwise unused location returns the control to its start state.

9 Claims, 1 Drawing Figure

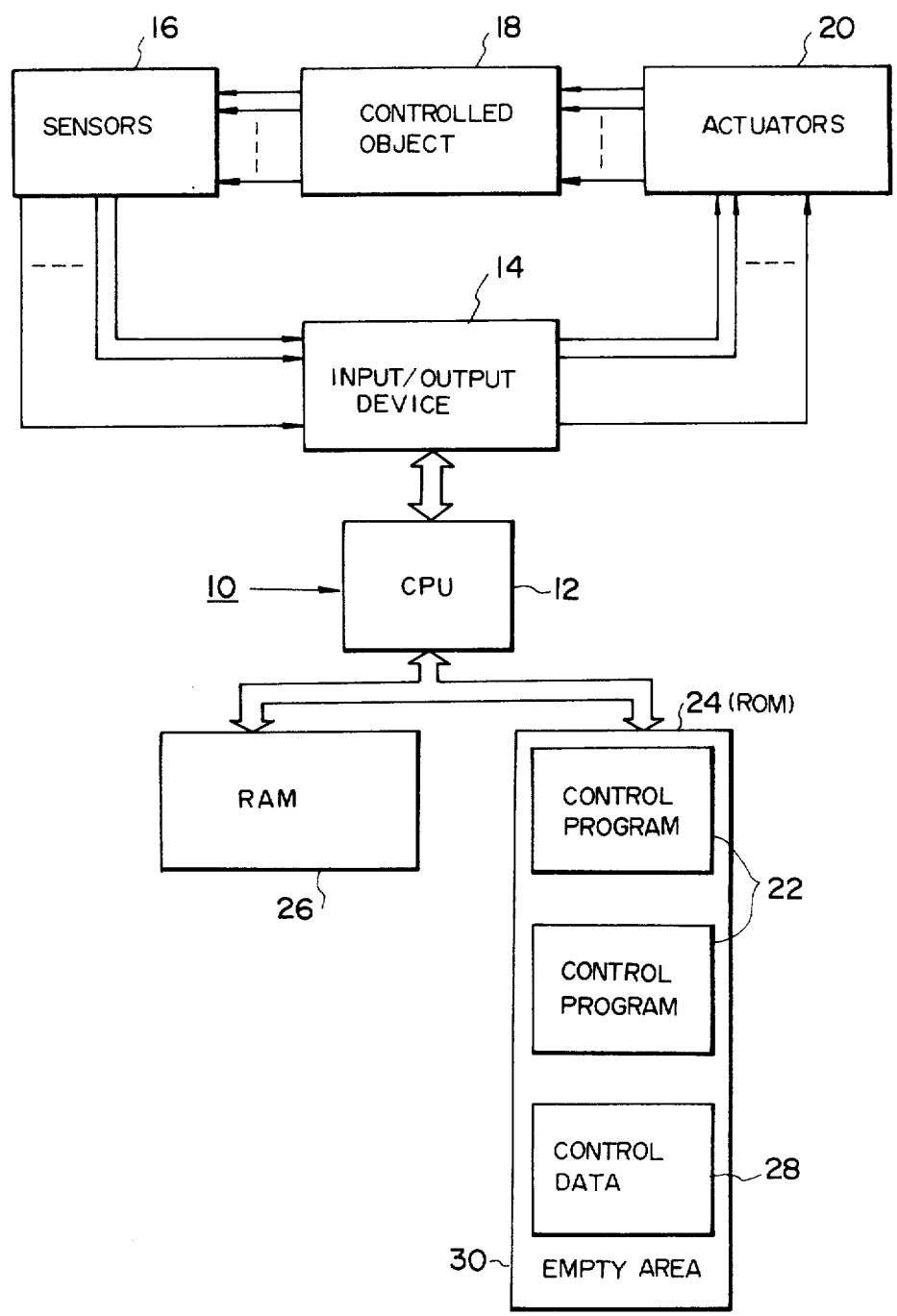

FAIL-SAFE CONTROL COMPUTER

BACKGROUND OF THE INVENTION

The present invention relates to a stored-program control computer and more particularly to such a computer that includes program transfer control instructions in a noncontrol program area of memory.

Control devices have been developed which use a stored-program microcomputer to control various devices such as power plant, i.e., internal combustion engine or the like, in an automotive vehicle. Such a computer uses a memory in which a control program is previously written. This program has been read, instruction by instruction, by a central processor unit (CPU) to provide control of the controlled device. The CPU has a program counter having a count that sequentially increases to sequentially change an address to be referenced in the memory; the address value is altered for jump instructions, subroutines, etc.. If such a computer is used under conditions where external disturbances, such as electrical noise from the ignition system in an automotive vehicle, occur, various registers or counters in the CPU are often disturbed, leading to malfunction of the computer. The program contains instructions written in the memory, each of which instructions includes several steps, the number of which varies according to the instruction. The external disturbances are likely to affect the program instructions causing the CPU to read an incorrect instruction. For example, disturbing the value in a program counter may cause addresses used for accessing instructions or numerical data to be read as numerical value or instruction addresses, respectively. As a result the program control of the program goes wrong and may cause the computer to run wild beyond control.

SUMMARY OF THE INVENTION

Therefore, it is an object of the present invention to provide a control system and method which is prevented from running wild.

BRIEF DESCRIPTION OF THE DRAWINGS

Other objects, features and advantages of the present invention will be more apparent from the following description of a preferred embodiment, taken in conjunction with the accompanying drawing, which are given by way of illustration only, and are not limiting. In the drawing, the sole FIGURE is a block diagram of a control system which carries out the present invention.

DETAILED DESCRIPTION OF THE PREFERRED EMBODIMENT

Referring to the FIGURE, preferred embodiment of the present invention is shown as control system 10. Normally, a central processor unit (CPU) 12 receives from sensors 16 via input/output device 14, information signals representative of the operational state of a controlled object 18 such as an internal combustion engine. The CPU 12 responds to the information signals to calculate output signals, which cause actuators 20 to actuate the engine 18, according to a control program 22 stored in a read only memory (ROM) 24. Control program 22 actuates object 18 in response to the information signals and control signals respectively stored in random access memory (RAM) 26 and control data 28 memory field, which is part of ROM 24.

CPU 12 includes a program counter (not shown) which determines which instruction in the control program 22 should be next executed. If the program counter address is disturbed for some reason or other, the CPU 12 incorrectly accesses the wrong address in control program 22, causing the wrong program step to be read from program 22. This may cause the program to and may run wild and produce incorrect results. For example, the address in the program counter may determine that the next instruction to be obeyed is in an empty area 30 in the ROM 22. This determination of the empty area 30 may occur, when a commercially available ROM is used because programming of a commercially available ROM is apt to leave an empty area in the memory. Design of a ROM that is used exclusively for controlling each particular controlled object (such as an internal combustion engine) would eliminate the empty area. However, this would lead to increasing the manufacturing cost.

According to the present invention, such an area, as would be originally left empty during programming, contains a written "Dummy" instruction to return control to a normal position for example, to a start address of an initial value setting routine in the control program 22. At the address of the initial value setting routine there are stored signals which represent initial values for the input and output information. Alternatively, the normal position can be a start address of a routine that exclusively processes abnormalities occuring in the execution of the program. Thus, if the contents of RAM 26 and the values in the input/output device 14, which are incorrectly written due to the wild execution of the program, are revised, then control returns to the normal state.

In this particular embodiment, the contents of RAM 26 are cleared in an initial value setting routine in the control program 22. The initial value setting routine is addressed before any other circuit elements after a power supply (not shown) has been switched on to feed electric power to the system 10. The initial value contents of RAM 26 may be predetermined as necessary, or may be initially set so that the input/output device 14 operates properly. Consequently, the contents of the above dummy instructions are set so that control returns to the start address of the initial value setting routine. Alternatively, a routine exclusively for processing abnormalities in the execution of the program may be provided. After a disturbance, the program returns to the start address of the routine for processing abnormalities in program execution.

Various other ways can be used for returning control to the start address of the initial value setting routine, etc.. In one preferred embodiment, a program instruction is composed of one to several units (for example, 1 to 3 bytes each including 8 bits), wherein each unit includes a fixed number of bits (in the particular embodiment, 8 bits, i.e. 1 byte) in ROM 22. Control can return to the start address of an initial value setting routine, etc., if a series of instructions SWI, each having a 1 byte length, is loaded into the empty area (the whole area can be filled with such instructions). This technique has been found particularly useful when a microprocessor M 6800, manufactured by Motorola Semiconductor Products Inc., is used. SWI is an instruction to interrupt and start a new program from an address which is represented by a numerical value written at a particular address in the control program 22. Thus, if the blank area 30 is completely filled with SWI instructions, control is necessarily returned to a particular address in a predetermined routine.

Alternatively, a JMP instruction, to rewrite the contents of the program counter in CPU, may be used. The JMP instruction, which consists of 3 bytes in the preferred embodiment, rewrites the contents of the program counter, and incorporates an address for this rewriting. A series of dummy instructions NOP, each of one byte in length, is loaded in the empty area 30 in the program area to advance only the value in the program counter without executing any other instructions. The JMP instruction is loaded in the last three bytes of the empty area 30.

When a processor other than the Motorola microprocessor M 6800 is used as a CPU, an instruction to effect the same control as mentioned above can be used in the same way to obtain similar advantages.

In a system which uses instructions of a different type from those in the particular embodiment, similar instructions can be used to realize similar effects easily.

As clear from the above, according to the present invention, when a computer is used under conditions in which there are many external disturbances which are causes of malfunctions, such as in control of an internal combustion engine of an automotive vehicle, an instruction to return control to a normal state is stored in an originally empty area of a program memory to prevent the computer from running wild and therefore becoming uncontrollable.

Although the present invention has been shown and described with reference to a particular embodiment thereof, and with reference to the illustrative drawings, it should not be conceived of as limited thereto; various alternations, ommissions, and modifications to the form and the content of any particular embodiment could be made therein, without departing from the spirit of the invention, or from its scope; and it is therefore desired that this scope should be defined, not by any particular features of the shown embodiment (which is given, as were the drawings, for the purposes of elucidation only), but solely by the accompanying claims.

What is claimed is:

1. A method of operating a stored-program control computer system including a CPU and a ROM containing a control program and a memory area not directly used for the control program, said non-control-program area being loaded with instructions such that transfer of program control to substantially any one of these instructions eventually leads program control to a correction routine which is part of the control program, the program control having a tendency inadvertently to be at one of the instructions, comprising in response to the program control being inadvertently at one of the instructions leading the program control to the correction which is part of the control program.

2. The method of claim 1 wherein the correction routine includes an initial value setting routine for initializing the control program when the computer system is initially activated to perform its control function, and in response to the computer being initially activated to perform the control function thereof entering the initial value setting routine to initialize the control program.

3. The method of claim 1 wherein the program control is led to only the correction routine from said non-control-program area.

4. The method of claim 1, 2 or 3 wherein the instructions loaded in said non-control-program area are interrupt instructions for redirecting program control to a particular address stored in the ROM, said particular address being the entry point of said correction routine, said leading step including reading the interrupt instructions loaded in the non-control-program area, and in response to the read interrupt instructions redirecting program control to the particular address.

5. The method of claim 4 wherein a vehicle internal combustion engine is responsive to control signals derived by the computer, and feeding control signals from the computer to the engine.

6. The method of claim 1, 2 or 3 wherein the last instruction loaded in the non-control-program area is a jump instruction which rewrites the address of the program control to an entry point of said correction routine, and the other instructions loaded in the non-control-program area are instructions which do nothing except increment the address of program control, so that if an address in the non-control-program area is read, the address of the program control is repetitively incremented until the last jump instruction loaded in the non-control-program is read, whereupon the program control address is rewritten to the entry point of the correction routine.

7. The method of claim 6 wherein a vehicle internal combustion engine is responsive to control signals derived by the computer, and feeding control signals from the computer to the engine.

8. The method of claim 1, 2 or 3 wherein a vehicle internal combustion engine is responsive to control signals derived by the computer, and feeding control signals from the computer to the engine.

9. A method of controlling the operation of a controlled device in response to signals from a programmed computer having a program counter that is susceptible to running wild, the computer including a memory accessed in response to a count in the program counter, the memory including a control program portion for controlling operation of the device, the memory having a predetermined capacity and including an area that is normally not used to store signals for controlling operation of the device, the normally unused area of the memory being unused because the memory is not custom designed for the control operation and being accessed in response to the program counter running wild, a dummy instruction being loaded in an address of the normally unused memory area, the dummy instruction in the normally unused memory area commanding the program counter to return to a normal start address for the control program portion, comprising in response to the program counter running wild to reach the address in the unused memory area where the dummy instructions is located, reading out the dummy instruction, and executing the read out dummy instruction.

* * * * *